Nov. 14, 1967

A. J. KLING ET AL 3,352,729

METHOD OF MANUFACTURING STRONG RETICULATED ELECTRODES

Filed Dec. 30, 1963

Inventors:
August J. Kling;
James E. Beggs,
by John P. Dellitt
His Attorney.

Inventors:
August J. Kling;
James E. Beggs,
by John P. Dellitt
His Attorney.

Nov. 14, 1967   A. J. KLING ET AL   3,352,729
METHOD OF MANUFACTURING STRONG RETICULATED ELECTRODES
Filed Dec. 30, 1963   3 Sheets-Sheet 3

Inventors:
August J. Kling;
James E. Beggs,
by John P. Dellitt
His Attorney.

United States Patent Office 3,352,729
Patented Nov. 14, 1967

3,352,729
METHOD OF MANUFACTURING STRONG
RETICULATED ELECTRODES
August J. Kling, Scotia, and James E. Beggs, Schenectady,
N.Y., assignors to General Electric Company, a corporation of New York
Filed Dec. 30, 1963, Ser. No. 334,306
4 Claims. (Cl. 156—3)

ABSTRACT OF THE DISCLOSURE

A strong composite reticulated electrode consisting of a network of fine interconnected bars is constructed by applying a photo-resist material to an unsupported thin sheet of electrode material having a thickness of the order of the bars of the reticulation and which consists of tungsten, titanium, molybdenum or the like. Each sheet of coated material is exposed a plurality of times to a negative pattern corresponding to the desired reticulated electrode structure, developed and etched to obtain a quantity of positive duplicates corresponding to the pattern. The positive duplicates are aligned in registry and bonded together to form a fine reticulated electrode structure having high strength characteristics.

---

Figure 1:
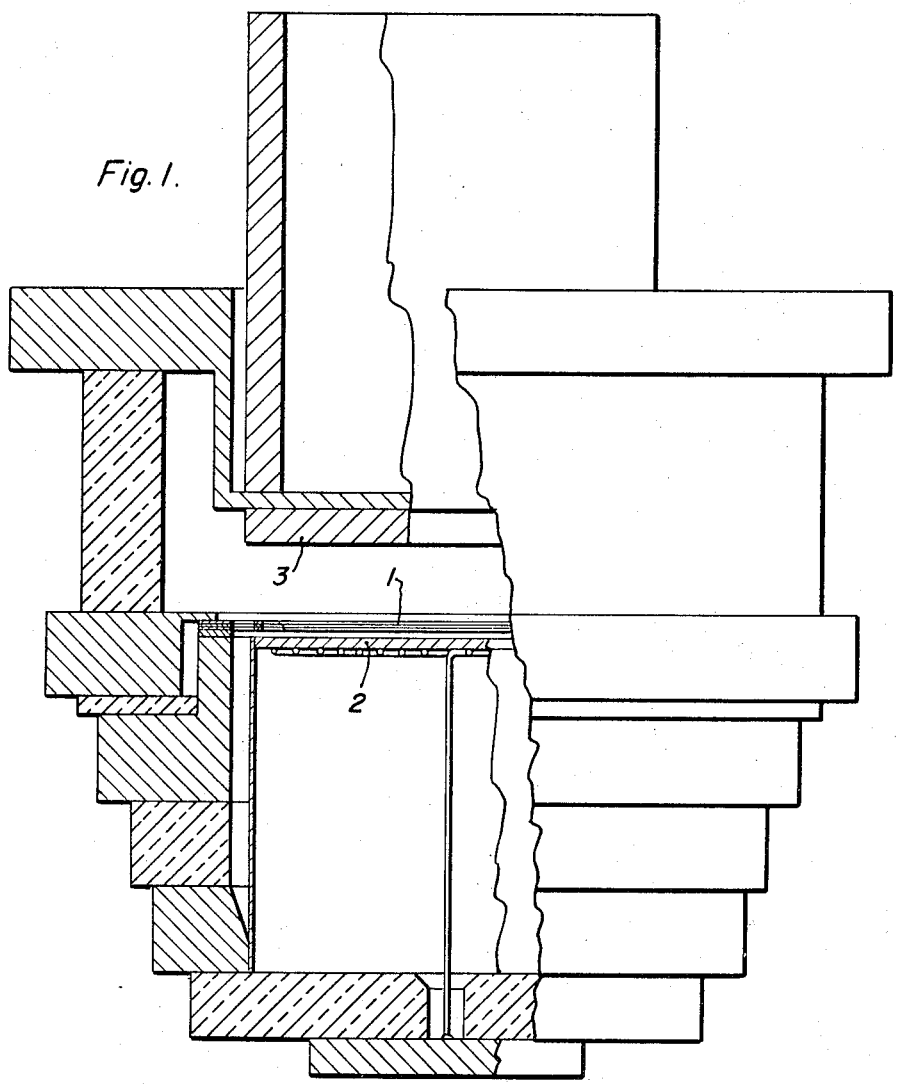

This inventiaon relates to a method of manufacturing electrodes for electron discharge devices and particularly to a method of manufacturing detailed grid structures from flat sheet material.

In the copending concurrently filed application of James E. Beggs, Ser. No. 522,013, filed Dec. 22, 1965, which is a continuation-in-part of application Ser. No. 334,307, filed Dec. 30, 1963 (now abandoned), and assigned to the assignee of the present invention, an electron discharge device electrode structure is described and claimed having a fine or reticulated configuration for placement in close proximity to the cathode of the device. Discharge devices of this general type are described and claimed in Beggs Patent 2,680,824, also assigned to the assignee of the present invention. This kind of discharge device may be miniaturized in structure and conveniently provided with accessible ring-like terminals. In one instance, thin wafer-like vacuum tubes are available having a diameter on the order of 0.32 inch and a height of approximately 0.073 inch. These devices because of their miniature size are useful at high frequencies, because the electrodes are closely spaced reducing the electron transit time therebetween.

Heretofore, intermediateperforate electrodes such as grid structures have been formed of fine wire or metal elements extended across an aperture in the electron stream. In keeping with the advantages of miniaturization, these grid structures are moved closer to the cathode to reduce transit time effects. However, at very close spacings the grid structure must become finer and more closely meshed to be effective. Unfortunately when fine wire structures are brought very close to a heated cathode, for example in distances approaching one mil from the cathode, the cathode heat has the undesirable effect of warping the grid in an axial direction, sometimes causing contact with other electrodes as well as variation in tube characteristics.

In the aforementioned Beggs application Ser. No. 522,013 a non-warping grid structure is described and claimed which is formed of thin laminations of sheet material. This laminated electrode may be placed very close to the cathode and although it has a very fine mesh structure it nonetheless exhibits considerable mechanical strength because of the laminated construction and configuration employed. The present invention relates to an advantageous method of forming such electrode structure.

In accordance with the present invention, very thin sheet material, of a metal appropriate for electrodes in an electron discharge device, e.g. tungsten, titanium, molybdenum and the like, is coated with a photo-resist material and exposed to a negative pattern corresponding to a desired finely reticulated electrode structure. Sheet material is exposed to the same pattern a plurality of times and then developed and etched leaving plural, thin, positive duplicates corresponding to the pattern. The thin positive duplicates are aligned in registry and bonded together forming a fine reticulated electrode structure having high strength characteristics.

Figure 1A:
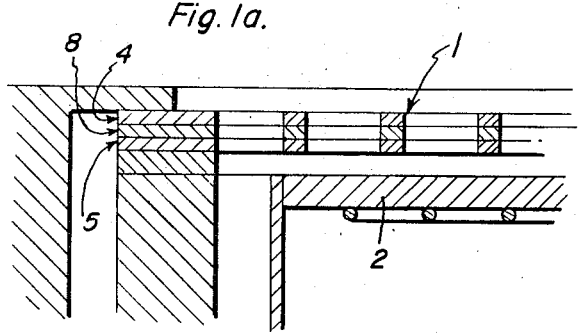
Figure 2:
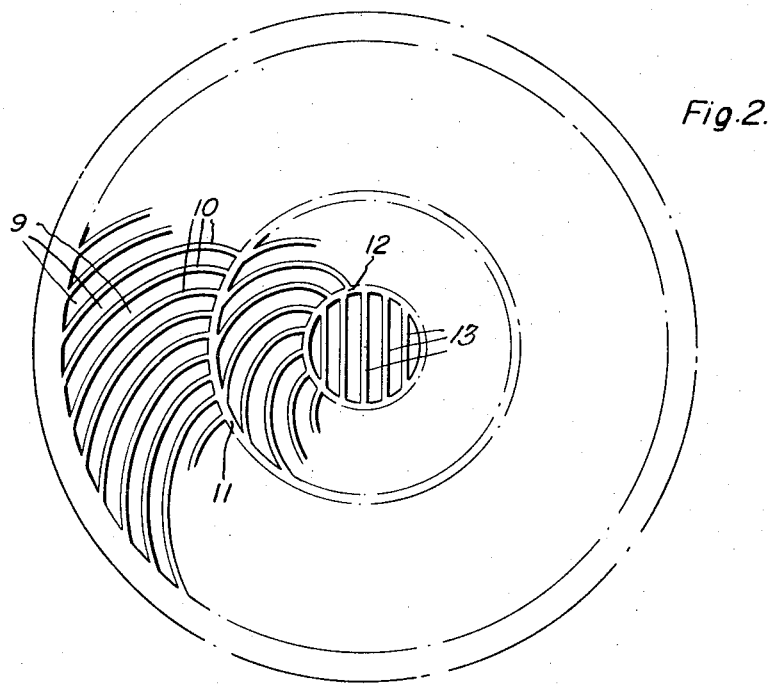
Figure 3:
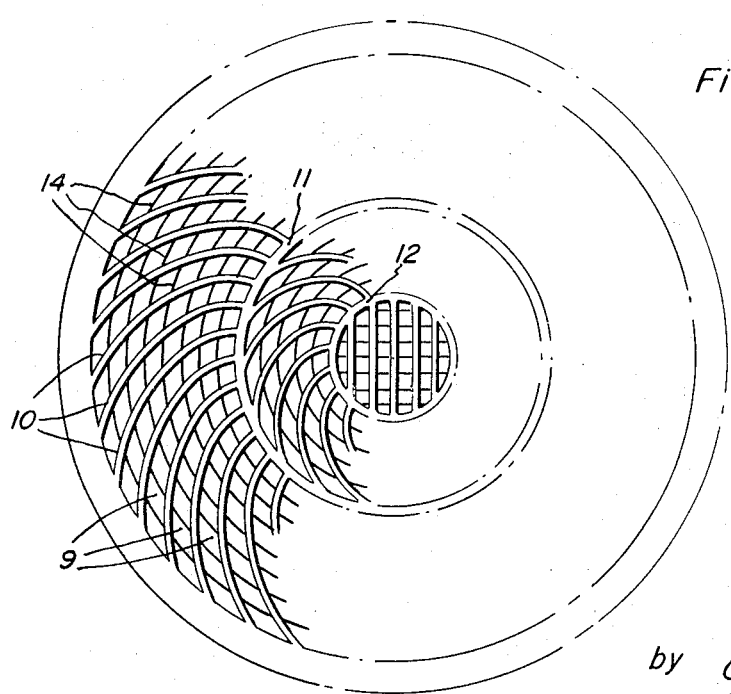
Figure 4:
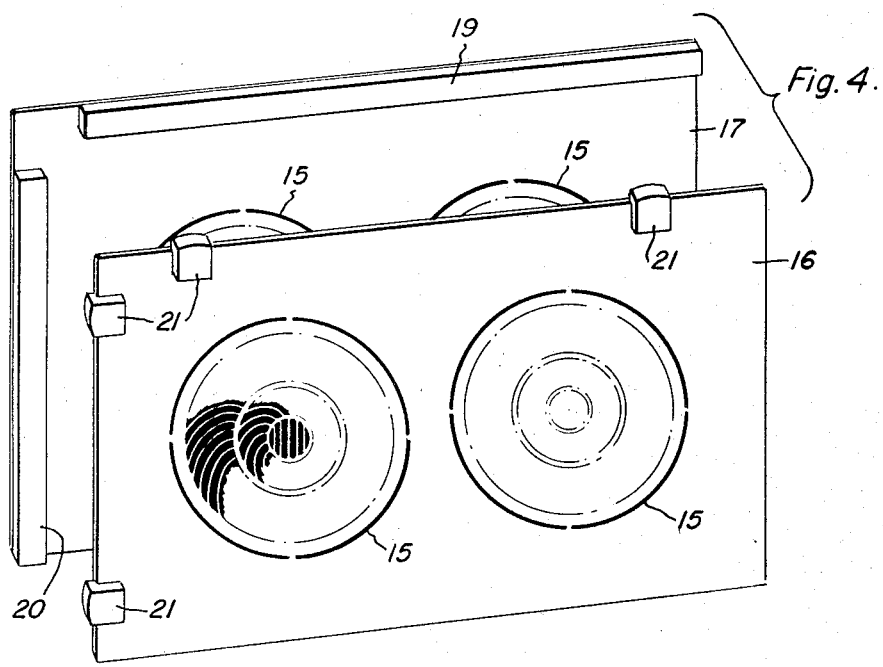
Figure 5:
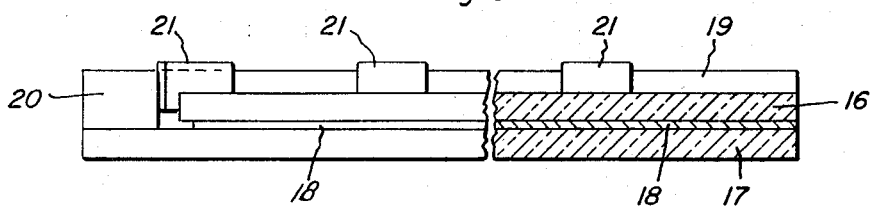
Figure 6:
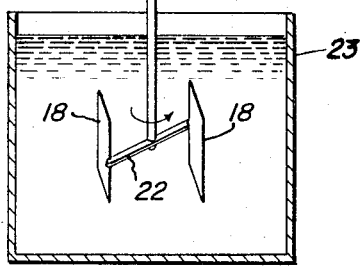

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a cross-sectional view of a miniature electron discharge device,

FIG. 1a is a cross-sectional view of a portion of a grid electrode in the FIG. 1 device, FIG. 2 is a flat side view of a first reticulated electrode structure formed in accordance with the present invention, FIG. 3 is a flat side view of a second reticulated electrode structure formed in accordance with the present invention, FIG. 4 illustrates a pair of negative patterns on a pair of glass plates, FIG. 5 illustrates the FIG. 4 pattern plates disposed in registry with electrode sheet material therebetween, and FIG. 6 is an etchant circulating device suitably employed in accordance with the present invention.

Referring to FIG. 1, illustrating an electron discharge device and electrode structure of the type set forth and claimed in the aforementioned Beggs application 522,013, a laminated grid electrode structure 1 is disposed adjacent a heated cathode electrode 2 in close proximity thereto and between said cathode and anode electrode 3. This grid electrode structure 1 may be spaced on the order of between one half mil and one mil from cathode electrode 2. In order to be effective as a grid electrode, grid electrode 1 should have a spacing between grid elements on the order of the spacing between the grid electrode and the cathode. A desirable configuration for such grid electrode is shown in FIGS. 2 and 3, illustrating greatly magnified side views of grid electrodes of the type employed at 1 in FIG. 1, having advantageous tiered-spiral configuration more fully described hereinafter.

FIG. 1a is a cross-sectional view of a portion of grid electrode 1 showing it to be laminated in form, the laminations preferably having the shape shown in FIGS. 2 and 3. The laminated structure is found to impart greater strength to the fine reticulated grid configuration than can be attained in a unitary structure of whatever shape. The intra-grid spacing may then be small and the grid placed close to the cathode; the resulting heat imparted to the grid structure from the cathode does not produce adverse movement of the grid structure because of the physical strength and rigidity thereof. Grid temperature itself rather than distortion resulting from grid temperature, becomes the final limitation in the spacing achieved. Therefore very close spacings resulting in very low transit times are possible.

The present invention is concerned with the manufacture of such a laminated structure. The grid laminations may be formed of a plurality of metals, for example, tungsten, titanium, zirconium, molybdenum, hafnium, tantalum, and other conducting refractory metals appropriate in the formation of electrodes in electron discharge devices. The laminations may be of all one metal or may be alternate metals. For instance, in FIG. 1a, the outer laminations 4 and 5 may be titanium with the middle lamination 8 formed of tungsten.

All such laminations whether of the same or different materials are formed in substantially the same shape, for example, the advantageous tiered-spiral shape illustrated in FIGS. 2 and 3. The latter configuration is more fully described in the aforementioned copending Beggs application. Briefly, the spaces 9 between ribs 10 are of substantially constant width along a spiral-like path resulting in a substantially uniform amplification factor, $\mu$, across the face of the grid. This spiral-like structure also tends to produce physical rotation of the inner grid portions 11 and 12 during heating rather than axial movement towards or away from a cathode in a tube. This result is most readily accomplished providing plural laminations to secure sufficient strength and depth to the resulting electrode structure so grid ribs 10 have greater axial depth than width.

The central portion 12 of the grid structure conveniently comprises straight parallel ribs 13 having equal spaces therebetween of approximately the same spacing as the spiral ribs. In FIG. 3 additional very fine cylindrical ribs 14 are added to the FIG. 2 configuration. This fine structure may be employed on one lamination, for example, lamination 5, nearest the cathode whereby greater grid control is achieved. Lamination 5 may suitably be thinner than the other laminations in such case. The remainder of the grid electrode structure not only acts as a support for the finer structure of lamination 5 but also acts as a heat sink for preventing destruction of the fine structure including ribs 14.

The grid laminations are preferably quite thin, for example having the thickness of from 0.0005 to 0.006 inch. The laminations are conveniently formed from sheet or foil material of such thickness. The sheet is initially coated with a photo-resist material and then exposed to a pattern which is the negative of the desired electrode configuration, for example, a negative of the configurations illustrated in FIGS. 2 and 3, this pattern being conveniently provided photographically by photographic reduction on one or more glass slides. An appropriate negative pattern is illustrated at 15 in FIG. 4, and is photographically duplicated on an upper glass slide 16 and a lower glass slide 17.

Glass slides 16 and 17 are aligned as shown in FIG. 5 with the identical negative patterns in registry on either side of a sheet of photo-resist coated electrode material 18 clamped therebetween. Edge bars 19 and 20 secured to slide 17, and guide bearings 21, similarly attached to slide 16, aid in the accurate juxtaposition of the two slides when sheet material 18 is in place. Other aligning jigs or the like may also be used.

After coating of sheet material 18 with a photo-resist and placement thereof between slides 16 and 17, the combination is exposed to light whereby areas of the resist which are struck by light or shadowed by the pattern are rendered selectively and differentially more or less soluble in a developing fluid or medium. The pattern is developed for selectively cleaning off the resist and in order to bare areas around the desired pattern, in the usual case. After development, etchant solution is then applied which etches sheet 18 away, around the desired positive copy of the electrode configuration.

A number of such electrode laminations are formed in this manner using an identical pattern and then the electrode laminations are advantageously stacked in registry and sealed together forming the end product electrode. A number of bonding methods may be employed between laminations depending upon the particular electrode materials. Tungsten laminations may be suitably flashed with a soldering material such as gold for bonding to other layers. Titanium, zirconium and hafnium laminations are suitably coated with nickel forming a surface of nickel titanium eutectic for bonding to other materials at a temperature of approximately 955° C. Molybdenum coated with a thin layer of nickel brazes at 1320° C. to other laminations. Alternatively, zirconium, titanium, hafnium, molybdenum and tantalum laminations may be sinter-bonded together or bonded by heat under pressure.

A number of photo-resists are appropriate for coating sheet material 19 in accordance with the present invention, for example, Kodak photo-resist or metal etch resist, fish glue treated with a chromate or dichromate, or solutions of polyvinyl alcohol treated with a chromate. In the latter instance, ten parts by weight of polyvinyl alcohol may be added to 250 parts water, and three parts ammonium dichromate. The photo-resist is allowed to dry and is of course kept dark until exposed.

After exposure, the photo-resist is developed with a developing solution appropriate to the particular resist used. For example, polyvinyl alcohol resist is developed in water while the Kodak resists are developed in solutions appropriate therefore as recommended by the manufacturer. The sheet 18 with the Kodak metal etch resist thereon is desirably baked at 120° C. for five to ten minutes after developing. The resulting resist should be about $\frac{1}{2}$ to $\frac{2}{10,000}$ of an inch thick.

Now the sheet material 18 with the developed resist thereon is exposed and then treated by a suitable etchant depending upon the sheet 18 material. A dilute mixture of approximately 10 percent nitric and two percent hydrofluoric acid works well for titanium, zirconium and hafnium. In the case of tungsten a solution of approximately 0.44 gram/ml. of $K_3Fe(CN)_6$ and approximately 0.033 gram/ml. of KOH or NaOH is appropriate. For tungsten an electro-etch may also be used, with sheet 18 connected as an anode in a water solution of about 0.5 to 1.0 normal sodium or potassium hydroxide. An appropriate etchant for moylbdenum is a mixture of nitric and sulfuric acid in about fifty percent water. Etching of tungsten takes about eight to fifteen minutes in the ferricyanide solution, and about five minutes or more in the instance of electro-etching, depending on the current used. Titanium etching requires approximately ten minutes.

During etching, in the etching solutions above suggested, and for the time periods indicated, it is very desirable to provide circulation in the etching solution. For example, the etching solution is pumped in and out of a container including sheet 18 in such a manner as to stream the solution rapidly and uniformly over the surface of the sheet. Uniformity of circulation is important for uniform etching. Alternatively the sheet being etched is moved in the solution. An apparatus for accomplishing the latter type of circulation is illustrated in FIG. 6. In accordance with such apparatus, sheet 18 is supported from a bracket 22 in a container 23 holding the etchant solution. A motor 24 having a shaft 25 connected to bracket 22 rotates the sheet in the solution. Circulation speeds on the order of 260 feet per minute are desirable. In addition to circulation it is, in some cases, advisable to supplement or improve the effects of circulation in creating a mild brushing or abrasive action in the solution. Such brushing action can be accomplished using a brush or other suitable fibers wiping against the etched surfaces, or it can be done with suitable granules or fibers suspended in the etching solution, for example, glass beads or fibers or powdered glass or ceramic material. The purpose to this is to aid in removal of any products of reaction of the etchant with the metal, for keeping the surface freshly clean achieving optimum effect of the etchant.

In accordance with a variation of the present invention, the sheet of electrode material is first plated with another metal material having a lower melting point than the refractory material, for example, copper, nickel, silver, gold or platinum. The photo-resist for the latter metal is then applied. After development, the plate metal is etched off in developed areas in a solution suitable for etching such metal. A pattern of plated metal then underlies the photo-resist pattern, so that if the latter comes off, the plated pattern will protect the electrode. For etching copper, dilute nitric or sulfuric acid is an appropriate etchant. Of course the backup metal is then preferably removed before laminating, as is the photo-resist when a back-up metal is not used.

Various alternative procedures are possible in accordance with the present invention. For example, although applying a photo-resist pattern on both sides of the electrode metal is found to be superior in providing accurate and finely detailed electrode laminations, such laminations can be formed somewhat less accurately in exposing only one side of the photo-resist covered electrode metal plate to the pattern before development. Etching from both sides has been found to allow accurate etching in less time and with less likelihood of undercutting of the finished product.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desired to secure by Letters Patent of the United States is:

1. A method of making a strong, composite, reticulated electrode structure whose reticulation consists of a network of fine interconnected bars comprising the steps of applying a photo-resist to a thin refractory metal sheet of electrode material having a thickness of the order of 0.006 inch or less and of the order of the bars of the reticulation, exposing several areas of sheet material to the same reticulated pattern, developing said photo-resist, etching away the material around the pattern with an etchant leaving positives of said reticulated pattern formed of said sheet material, superimposing in registry as laminations said positives made from the same pattern, and thermally bonding said laminations in such registry to form an electrode.

2. The method according to claim 1 wherein said thin sheet electrode material is selected from the group consisting of titanium, tungsten, molybdenum, zirconium, tantalum, and hafnium.

3. A method of making a strong, composite, reticulated electrode structure whose reticulation consists of a network of fine interconnected bars comprising the steps of applying a photo-resist to a thin refractory metal sheet of electrode material having a thickness of the order of 0.006 inch or less and of the bars of the reticulation, exposing to light several areas of sheet material through the same reticulated pattern including both sides of the same sheet with said same pattern in accurate registry, developing said photo-resist, etching away the material around the pattern leaving positives of said reticulated pattern formed of said material, superimposing said positives in registry as laminations, and thermally bonding said superimposed positives to form an electrode in which each lamination is in electrical conductive contact with an adjacent lamination.

4. A method of making a strong, composite, reticulated electrode structure whose reticulation consists of a network of fine interconnected bars comprising the steps of plating a thin sheet of refractory metal electrode material having a thickness of the order of 0.006 inch or less and of the bars of the reticulation with a thin coating of a metal having a lower melting point than said refractory metal, applying a photo-resist to the sheet electrode material, exposing several areas of the coated sheet material through the same reticulated pattern, developing said photo-resist, selectively etching away the exposed metal coating, then selectively etching away the sheet refractory material leaving positives of said reticulated pattern formed of said sheet material, superimposing said positives in registry as laminations, and thermally bonding said laminations to form said electrode.

References Cited

UNITED STATES PATENTS

| | | | |
|---|---|---|---|
| 928,922 | 7/1909 | Albert | 156—5 |
| 3,108,919 | 10/1963 | Bowman et al. | 156—18 |
| 3,131,103 | 4/1964 | Bogue et al. | 156—3 |
| 3,219,749 | 11/1965 | Shuster et al. | 156—3 X |
| 1,614,567 | 1/1927 | Laise. | |

JACOB H. STEINBERG, *Primary Examiner.*

ALEXANDER WYMAN, *Examiner.*